United States Patent Office 3,359,898
Patented Dec. 26, 1967

3,359,898

PROCESS FOR ELECTROTYPE PRINTING PLATE

Frederick L. Baier, South Plainfield, and John B. Wheeler III, Somerville, N.J., assignors to Union Carbide Corporation, a corporation of New York No Drawing. Filed Aug. 27, 1965, Ser. No. 483,342
13 Claims. (Cl. 101—401.1)

ABSTRACT OF THE DISCLOSURE

Process for preparing electrotype printing plates by (1) rendering the surface of a thermoplastic polyarylene polyether matrix electrically conductive, (2) electroplating a platable metal shell having a roughened, semi-porous back and a thickness of from about 0.5 to about 4 mils to the electrically conductive surface of the matrix, and (3) backing the shell with a thermoplastic material while maintaining the shell in contact with the matrix.

This invention relates to an improved electrotype printing plate comprising an electrotype shell and a thermoplastic backing which is characterized by superior wear and abrasion resistance as compared to conventional electrotype printing plates, and to an improved process for preparing such plates.

Various kinds of duplicate printing plates have been used in letter press printing for more than one hundred and seventy years. Such plates impart hardness, toughness, and flexibility to the printing surface and thus can be used for long runs and can be readily curved for mounting on rotary presses. Such duplicate plates are a necessity because lead alloy printing types and original engravings are soft and thus susceptible to wear and damage, and cannot be curved for mounting on rotary presses.

One widely used duplicate printing plate is an electrotype printing plate. These plates are prepared by a complex process which includes preparing an original typeform, or original photoengraved etched plate and molding these against a 30 to 40 mil thick sheet of rigid polyvinyl chloride to form a negative mold of the original which is known in the art at a matrix. The surface of the matrix is rendered electrically conductive and is immersed in a nickel electroplating bath to deposit a layer of nickel on the matrix surface generally no thicker than about 0.5 mil. This is followed by immersion in a copper electroplating bath where a 12 to 15 mil thick copper layer is plated over the nickel layer. Finally a thin layer of tin is plated over the copper to provide an adhesive base for the lead backing to follow. The nickel-copper-tin composite shell is separated from the matrix and the edges are cupped to form a pan which is filled with molten lead at 350° C. and allowed to cool. The resulting lead-backed electrotype is usually warped and has to be flattened by a time consuming hammering process. The electrotype is curved, leveled along the edge, shaved from the back to the desired thickness and non-image areas routed out. Such a nickel-faced copper electrotype can run from 300,000 to 400,000 impressions before wear becomes noticeable whereas an all-copper electrotype can only run up to about 100,000 impressions. An all-nickel electrotype would be far better than the copper or nickel-faced copper types, but because the electroplated shell must be thick enough to be self-supporting and to stand up during the backing operation, an all-nickel electrotype has heretofore been economically untenable.

To overcome some of the obvious disadvantages to a lead backing, polymeric materials such as polyepoxides, polyesters, polyvinyls, nylon and the like have been employed to back-up the electroplated shell. However, the use of such polymeric materials has not been entirely successful because of their poor adhesion to the shell and because of air entrapment between the backing and shell, among other reasons. Air entrapment is a result of low molding pressures, generally no higher than 80 p.s.i.g., which must be employed to prevent distortion of the upsupported electroplated shell.

It has been proposed to allow the electroplated shell to remain in contact with the matrix and backing the shell by spreading over its rear surface a low-pressure thermosetting resin paste having a low setting temperature and curing the paste to a thermoset back without the need of pressure. Such a process, however, is severely limited to the use of thermosetting resins which must be cured at a temperature that does not exceed the heat distortion temperature of the vinyl matrix since it remains in conact with the shell during curing. Thus the use of molten metal or thermoplastic materials requiring high molding temperatures cannot be employed in this process to back the shell because the heat distortion temperature of the vinyl matrix would be exceeded and distortion of the shell would result.

The present invention provides an improved electrotype printing plate characterized by a tenacious adhesive bond between shell and backing and superior wear and abrasion resistance as compared to prior lead-backed and thermoplastic-backed electrotypes. Electrotype printing plates of this invention have a press life of at least about 750,000 impressions, and when faced with a thin layer of chromium, have a press life of 7 to 8 million impressions. The process of this invention eliminates the need for electroplating a thick, self-supporting shell, a requisite in all prior processes, and is thus a vastly faster and more efficient process which produces a greatly improved electrotype printing plate.

Broadly, the process of this invention for preparing an elecertotype printing plate comprises rendering the surface of a thermoplastic polyarylene polyether matrix, described in detail herein, electrically conductive, electroplating a platable metal shell having a roughened, semi-porous back and a thickness of from about 0.5 to about 4 mils to the electrically conductive surface of the matrix, and while maintaining the so produced shell in contact with the matrix, backing the shell with a thermoplastic material employing heat and pressure. Because the back of the shell is roughened and semi-porous, the thermoplastic backing material readily forms a tenacious adhesive bond with the shell. Furthermore, because of the unusual thermal properties of the thermoplastic polyarylene polyether matrices used in this invention, temperatures of 300° F. and higher can be employed in applying the thermoplastic backing thus insuring a tenacious bond. Also, because the matrix remains in contact with the shell during application of the thermoplastic backing, the shell need only have a thickness of from 0.5 to 4 mils and molding pressures in excess of 60 p.s.i.g. and as high as 1500 p.s.i.g. can be employed without fear of deforming the electroplated shell.

The electrotype printing plate of this invention comprises an all-nickel shell having a roughened back and a thickness of from about 0.5 to about 4 mils and a thermoplastic backing material securely adhered to the back of the shell.

Additional treatment of the back of the shell to secure adhesion to the thermoplastic backing such as have been necessary with other plastic backing procedures is not required. Eliminated are such procedures as special adhesive primers, chemical treatment of the back of the shell to obtain a tightly bonded oxide coating, or the use of a gauze layer to absorb air.

One type of thermoplastic polyarylene polyethers used in the present invention are linear thermoplastic polymers having a basic structure composed of recurring units having the formula $$—O—E—O—E'— \qquad (I)$$

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl) propane, 1,1-bis-(4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone ($—SO_2—$), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of $\alpha$-pinene, and the like bisphenols where the hydroxyphenyl groups are bound to the same or different carbon atoms of an organic linking group.

Such dinuclear phenols can be characterized as having the structure:

$$HO(\overset{(Y)_r}{\overset{|}{Ar}}—R—\overset{(Y_1)_z}{\overset{|}{Ar}})OH$$

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, $r$ and $z$ are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, $—SO_2—$, and divalent organic hydrocarbon radicals such as alkylene, alkylidene, cycloaliphatic, or the halogen, alkyl, aryl or like substituted alkylene, alkylidene and cycloaliphatic radicals as well as alkylicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4'-dihydroxydiphenyl-methane, bis-(2-hydroxyphenyl)methane, bis-(4-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl) propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenylpropane, 2,2-bis-(4-hydroxyphenyl)-1,1,1,3,3,3-hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, 4,4'-dihydroxy-3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group ($—SO_2—$) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951), and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent groups which can activate displacement of halogens on two different rings, such as the sulfone group —$SO_2$—; the carbonyl group —CO—; the vinyl group —CH=CH—; the sulfoxide group —SO—; the azo-group —N=N—; the saturated fluorocarbon groups —$CF_2$—$CF_2$—; organic phosphine oxides

where R is a hydrocarbon group, and the ethylidene group

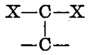

where X can be hydrogen or halogen or which can activate halogens on the same ring such as with difluorobenzoquinone, 1,4- or 1,5- or 1,8-difluoroanthroquinone.

If desired, the polymers may be made with mixtures of two or more dihalobenzenoid compounds each or which has this structure, and which may have different electron withdrawing groups. Thus the E′ residuum of the benzenoid compounds in the polymer structure may be the same or different.

It is seen also that as used herein, the E′ term defined as being the "residuum of the benzenoid compound" refers to the aromatic or benzenoid residue of the compound after the removal of the halogen atoms on the benzenoid nucleus.

From the foregoing it is evident that preferred linear thermoplastic polyarylene polyethers are those wherein E is the residuum of a dinuclear dihydric phenol and E′ is the residuum of a dinuclear benzenoid compound. These preferred polymers then are composed of recurring units having the formula

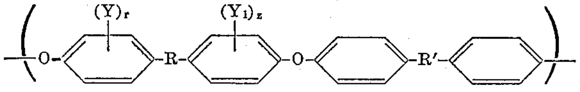

wherein R represents a member of the group consisting of a bond between aromatic carbon atoms and a divalent connecting radical and R′ represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where *r* and *z* are integers having a value from 0 to 4 inclusive. Even more preferred are the thermoplastic polyarylene polyethers of the above formula wherein *r* and *z* are zero, R is divalent connecting radical

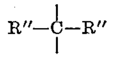

wherein R″ represents a member of the group consisting of hydrogen, lower alkyl, lower aryl, and the halogen substituted groups thereof, and R′ is a sulfone group.

Thermoplastic polyarylene polyethers described herein can be prepared as described in Belgian Patent 650,476 in a substantially equimolar one-step reaction of a double alkali metal salt of a dihydric phenol with a dihalobenzenoid compound in the presence of specific liquid organic sulfoxide or sulfone solvents under substantially anhydrous conditions, Any alkali metal salt of the dihydric phenol can be used as the one reactant.

Thermoplastic polyarylene polyethers described herein can also be prepared as described in Example 1 hereof and in the aforementioned Belgian Patent 650,476 in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

Thermoplastic polyarylene polyethers (Formula I) as described herein are characterized by high molecular weights indicated by reduced viscosity in indicated solvents. For purposes of the present invention, it is preferred that thermoplastic polyarylene polyethers (Formula I) have a reduced viscosity above about 0.35 and most preferably above about 0.4. The manner of determining reduced viscosity is detailed infra.

Another type of polyarylene polyethers used in this invention are thermoplastic polymers composed of recurring units having the formula

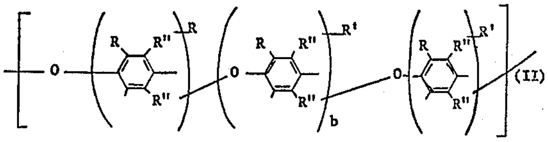

(II)

where the free valence of the terminal oxygen atom of one unit is connected to the free valence of the terminal benzene nucleus of the adjoining unit, *b* is an integer of from 0 to 1 inclusive, R is a monovalent substituent selected from the group of hydrocarbon radicals, halohydrocarbon radicals having at least 2 carbon atoms, alkoxy radicals and haloalkoxy radicals having at least 2 carbon atoms, R′ and R″ are the same as R and in addition hydrogen. Suitable polyarylene polyethers have an intrinsic viscosity of at least 0.07. Intrinsic viscosity is determined by dissolving the polymer in a good solvent for the polymer. A good solvent is defined as a solvent which will produce solutions of various concentrations such that when the viscosity is plotted against concentration, a straight line is obtained. Extrapolation of this line to zero concentration gives the intrinsic viscosity. See Buck et al., High Molecular Weight Organic Compounds, Interscience Publishers, Inc., New York (1949), pages 75–110.

Typical examples of the monovalent hydrocarbon radicals that R, R′ and R″ may be are alkyl, including cycloalkyl, for example methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octyldecyl, and so forth; alkenyl, including cycloalkenyl, for example, vinyl, allyl, butenyl, cyclobutenyl, isopentenyl, cyclopentenyl, linolyl, etc.; alkynyl, for example propargyl, etc.; aryl, including alkaryl, for example, phenyl, tolyl, ethylphenyl, xylyl, naphthyl, methylnaphthyl, etc., aralkyl, for example, benzyl, phenylethyl, phenylpropyl, tolylethyl, etc. The monovalent halohydrocarbon radicals may be the same as the hydrocarbon radicals, as outlined above, except methyl, wherein one or more of the hydrogen atoms are replaced by halogens, examples of which are chloroethyl, bromoethyl, fluoroethyl, dichloroethyl, bromopropyl, dichlorodifluoroethyl, difluoroiodoethyl, bromobutyl, fluoroamyl, chlorovinyl, bromoallyl, fluoropropargyl, mono-, di-, tri-, tetra- and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent alkoxy radicals are methoxy, ethoxy, propoxy, isopropoxy, butoxy, secondary butoxy, tertiary butoxy, amoxy, hexoxy, octoxy, decoxy, vinoxy, alloxy, butenoxy, propargoxy, benzoxy, phenylethoxy, phenylpropoxy, tolylethoxy, etc. The monovalent haloalkoxy radicals may be the same as the above oxyhydrocarbons except methoxy, where one or more of the hydrogens are replaced by a halogen, for example, fluorine, chlorine, bromine, or iodine, a few typical examples of which are chloroethoxy, bromoethoxy, fluoroethoxy, dichloroethoxy, bromopropoxy, difluorochloroethoxy, iodobutoxy, fluoroamoxy, chlorovinoxy, bromoalloxy, fluoropropargoxy, bromobenzoxy, chlorophenylethoxy, phenylchloroethoxy, bromotolylethoxy, etc. Preferably R′ and R″ are each hydrogen, R is a hydrocarbon radical of from 1 to 10 carbon atoms and the phenoxy substituent is in the para position.

Thermoplastic polyarylene polyethers of the class described herein (Formula II) can be prepared by reacting oxygen and an aryloxy-substituted monohydric phenol in the presence of a catalyst comprising a tertiary amine and a cuprous salt. A detailed description of the preparation of these polymers is contained in U.S. Patent 3,134,-753, which is incorporated herein by reference.

Sheets of thermoplastic polyarylene polyether suitable for forming into a matrix can be fabricated by any known thermoplastic forming technique such as extruding, compression molding, injection molding, solution casting and the like. The thickness of sheets employed is not critical but is rather governed by practical considerations such as cost and ease of forming. In general, the most useful range of thickness for thermoplastic polyarylene polyether sheets is from about 0.030 inch to about 0.250 inch while the range of from about 0.080 inch to about 0.125 inch is preferred.

As indicated above, the matrix can also be formed from a composite sheet of fiber-reinforced thermoplastic polyarylene polyether with the proviso that the thickness of the thermoplastic polyarylene polyether at the surfaces of the composite sheet is thicker than the deepest impression made into it during the formation of a matrix. To this end, any fiber reinforcing material can be used. Examples of such reinforcement are woven and unwoven fibrous cloth, fibrous mats and bats, continuous fibrous filaments and strands, and the like. Fiberglass, especially in the form of a thin mat or woven cloth, has been found to perform well. The use of fiber reinforcement adds strength to a matrix thereby extending its useful life and reduces uniform mold shrinkage down to levels as low as 0.1%.

The matrix is generally formed by contacting a sheet or composite sheet of thermoplastic polyarylene polyether described herein with an original type-form, engraving or photo etched plate, applying heat and pressure, separating the matrix and original and allowing the matrix to cool. In this manner, excellent reproduction of the original is obtained in the matrix.

The temperature at which a matrix can be formed is not narrowly critical. Obviously, the lowest temperature will be the temperature at which the polymer can be formed under pressure, and the highest temperature will be below the decomposition temperature of the polymer or softening point of the original. Temperatures ranging from 415° F. to 590° F., preferably 425° F. to 505° F. meet these practical criteria for the thermoplastic polyarylene polyether. Matrices can be formed from unmounted copper originals at temperatures of 415° F. to 590° F., from zinc and magnesium originals at temperatures of 425° F. to 505° F. and from type metal, such as Linotype (a registered trademark) metal which softens under pressure at about 440° F. at temperatures of 425° F. to 435° F.

Molding pressure can vary widely. Useful pressures range from 200 p.s.i. to 4000 p.s.i., preferably from 250 p.s.i. to 1200 p.s.i. Specific techniques for forming a matrix are detailed in the examples below.

In general, the martrix separates readily from an original without the aid of a mold release agent. However, if desired, mold release agents can be used to effect separation between the matrix and original. Suitable mold release agents are graphite, molybdenum disulfide, silicone oils, and the like. The use of solvents or agents which attack the matrix material should be avoid.

The polyarylene polyether matrix can be rendered electrically conductive by applying to the surface a conventional silvering solution to produce a thin conductive surface of silver thereon or by depositing a thin electroless metal layer on the surface of the matrix. Electroless metal deposition on the surface of the matrix can be accomplished by treating the surface of the matrix with a solution containing stannous chloride or other stannous salt, rinsing with water, treating to provide catalytic nucleating centers with a salt of a metal catalytic to the deposition of the desired metal, the ions of these metals being reduced to catalytic nucleating centers by the stannous ions adsorbed on the matrix surface and/or by reducing agent contained in the electroless metal deposition bath, rinsing with water, and depositing the desired metal by treating the catalyzed matrix surface with a metal salt plus a reducing agent therefor.

Particles of metals catalyze the electroless chemical reductoin deposition of copper, nickel and cobalt. For example, the following metals are catalytic to the deposition of copper, nickel and cobalt: copper, beryllium, aluminum, carbon, tungsten, tellurium, nickel, gold, germanium, silicon, molybdenum, selenium, iron, tin, and palladium. These metals are also catalytic to the deposition of lead, platinum, rhodium, ruthenium, osmium, iridium, iron, carbon, silver, aluminum, gold, palladium, and magnesium. Cobalt, nickel, and iron can be used to catalyze the depositoin of chromium.

One suitable process includes cleaning a polyarylene polyether matrix surface which is then sensitized with stannous chloride which is adsorbed on the surface. After rinsing, next comes activation to make the treated matrix surface catalytic by treating with a solution containing a salt of a precious metal such as palladium chloride. After rinsing, electroless metal deposition is accomplished by immersion in an electroless copper bath containing a copper salt, complexing agents to keep copper in solution and a reducing agent.

The electrotype shell is then deposited to the desired thickness by immersing the matrix with an electrically conductive surface in an electroplating bath which contains from about 0.1 to about 20 parts by weight of finely divided metal powder which is the same as the metal shell being deposited. Plating is usually carried out with sufficient agitation of the bath to keep the metal powder in suspension. A current density of up to 80 amperes per square foot can be used. In the alternate, the metal shell can be deposited from a conventional electroplating bath followed by immersion and electroplating in a bath containing metal powder as described above. The particles of metal in the bath settle on the shell as it is being deposited and are locked in thereby. As electroplating continues the back of the shell becomes more roughened and in the end the electrotype shell has a roughened, semi-porous back similar in texture to a rough grade of emery cloth. When the concentration of nickel powder in the bath is high, in excess of one percent by weight, the metal particles become "treed," this is, they form dendritic shapes which extend upward from the back of the electrotype shell. This roughened back of the nickel shell provides a mechanical lock for thermoplastic backing to adhere to and does away with the need for additional treatment such as adhesive primers or chemical treatment or an extra plated layer of copper.

While the electrotype shell remains in contact with the polyarylene polyether matrix, the thermoplastic backing is applied thereto. Because of the support imparted to the shell by the matrix and because of the excellent thermal properties of the thermoplastic matrix pressures of from about 60 p.s.i.g. to about 1500 p.s.i.g., and temperatures of from about 200° F. to about 350° F. can be employed in applying the thermoplastic backing without distorting or damaging either the shell or matrix in any way. The thermoplastic backing can be applied by compression molding techniques using sheet or pellets and by like techniques such as those described in U.S. Patents 3,023,700 and 3,031,960 which are incorporated herein by reference. Suitable thermoplastic backing materials can be fluxed below about 350° F. and include vinyl chloride polymers, vinylidene chloride polymers, natural and synthetic rubber compounds, polystyrene, ABS, polyolefins, polyethers, polyacrylates, polymethacrylates, polyamides, polycarbonates, polyhydroxyethers having the general formula $$\text{-}[\text{O—D—O—D}']_n$$

wherein D is the residuum of a dihydric phenol, D' is a hydroxyl containing residuum of an epoxide, and *n* represents the degree of polymerization and is at least 30 and is preferably 80 or more, such polyhydroxyethers containing small amounts, e.g. up to 20 percent by weight, of natural or synthetic rubber, compositions comprising a vinyl chloride polymer and a polymerizable acrylic acid ester and the like.

The nickel electrotype printing plate can be supported by the matrix to prevent distortion or damage to the shell during the usual finishing operations or it can be separated therefrom for such operations. Finishing operations include shaving the backing to the desired printing height, routing, leveling the edges, curving and mounting or rotary presses, mounting in tension lock-up devices, and the like.

For very long printing runs the electrotype printing plate can be electroplated in a conventional manner with a thin layer of chromium about 0.05 mil thick.

It is clear from the foregoing that any thermoplastic resin which can be fluxed below about 350° F. may be used to back up the electrotype shell by this invention. By varying the properties of the backing, the plate may be made stiff by the use of a hard, rigid material such as polyvinyl chloride or polyhydroxyether, or flexible by the use of low density polyethylene, plasticized polyvinyl chloride, ethylene/vinyl acetate copolymer, ethylene/acrylic acid copolymer, or ethylene/acrylic acid ester copolymer. An efficient means of making a duplicate printing plate with a hard, long wearing printing face and a resilient backing has long been sought. This invention provides such a plate having a long wearing metal surface and a flexible back which may be one of the above mentioned thermoplastic or rubber with a Shore A durometer reading from 30 to 100.

For purposes of illustrating the superior thermal properties of the thermoplastic polyarylene polyethers matrices used in this invention, Table I below lists the heat distortion point of several thermoplastics as compared to three thermoplastic polyarylene polyethers composed of recurring units having the formulas:

(I)

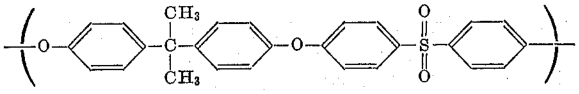

(II)

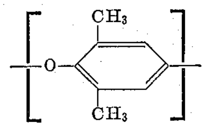

(III)

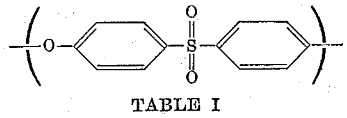

TABLE I

| Thermoplastic: | Heat distortion point at 264 p.s.i., ° F. (ASTM D-648) |
|---|---|
| Polyarylene polyether (I) | 350 |
| Polyarylene polyether (II) | 375 |
| Polyarylene polyether (III) | 422 |
| Bisphenol A polycarbonate | 270 |
| Bisphenol A polyhydroxyether | 185 |
| Polyvinyl chloride | 140 |
| Polyacetal | 255 |
| Polyamide (nylon Type 66) | 150 |
| Acrylonitrile, butadiene, styrene (ABS), rigid | 205 |
| Acrylonitrile, butadiene, styrene (ABS), impact | 185 |
| Polypropylene | 130–150 |

Table I demonstrates that the particular polyarylene polyethers can withstand molding temperatures of up to about their heat distortion points, about 350° F., 375° F., and 422° F., whereas other thermoplastics fall far short of this capability, the closest being 270° F. for polycarbonate. However, it is particularly desirable to mold electrotype backings at temperatures in excess of about 300° F. to reduce molding cycles to a minimum and to develop high quality securely adhered backings. Only thermoplastic polyarylene polyethers are amenable to temperatures in excess of 300° F. as is shown by Table I.

The following examples are illustrative of the present invention and are not intended to limit the same in any manner. All parts and percentages are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity}=\frac{t_s-t_0}{c\cdot t_0}$$

wherein:

$t_0$ is the efflux time of the pure solvent,
$t_s$ is the efflux time of polymer solution,
$c$ is the concentration of the polymer solution expressed in terms of grams of polymer per 100 ml. of solution.

EXAMPLE 1

*Preparation of thermoplastic polyarylene polyether (Formula I)*

In a 250 ml. flask equipped with a stirrer, thermometer, a water cooled condenser and a Dean-Stark moisture trap filled with benzene, there were placed 11.42 grams of 2,2-bis-(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130°–140° with good stirring for 4–5 hours. The viscous, orange solution was poured into 300 ml. water, rapidly circulating in a Waring Blendor, and the finely divided while polymer was filtered and then dried in a vacuum oven at 100° for 16 hours. The yield was 22.2 g. (100%) and the reaction was 99% complete based on a titration for residual base.

The polymer had the basic structure

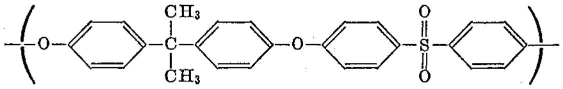

EXAMPLE 2

*Preparation of thermoplastic polyarylene polyether (Formula II)*

Oxygen is passed for a few minutes through a mixture of 0.4 g. of cuprous chloride and 30 ml. of pyridine to aid in the dissolving of the cuprous salt. Four grams of 2,6-dimethyl-4-(2',6'-dimethylphenoxy)phenol is added to the mixture. Oxygen is passed therethrough at a rate fast enough to provide an excess over that being adsorbed with vigorous stirring. The initial temperature is 29.5°

C. and rises to 51.5° C. during a 3 minute reaction period. Thereafter 360 ml. of an aqueous 2 N solution of HCl is added to precipitate the polymer. The polymer is then dissolved in chloroform and precipitated by adding dropwise to methanol containing 1% by volume of 12 N HCl. This last purification step is repeated. The solid product is poly-(2,6-dimethylphenylene-1,4)ether composed of recurring units having the formula

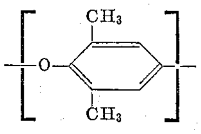

The isolated polymer has an intrinsic viscosity of 1.22.

FORMING A MATRIX AND MOLDING AGAINST THE SAME

EXAMPLE 3

Thermoplastic polyarylene polyether pellets having a reduced viscosity of 0.47 prepared as in Example 1 were vacuum stripped for 72 hours at 120° C. The pellets were then compression molded at 500° F. in an electrically heated hydraulic press into four plaques measuring 8" x 8" x ⅛". The first plaque was then contacted with a copper original relief printing plate coated with a silicone mold release oil and placed in an electrically heated hydraulic press having a four inch ram. The plaque and original were preheated at 470° F. for one and one-half minutes at zero pressure with the press platens closed. The thermoplastic matrix was then formed by applying 500 p.s.i. for one minute. The temperature was reduced to 200° F. and the original and matrix removed and cooled to room temperature. The resultant matrix was flat and had perfect reproduction of detail including small dots in the 150 lines per inch screens. Each of the three remaining plaques were formed into a matrix in the same manner as described with the same results. Each matrix formed was measured and was found to have uniformly shrunk in all directions 0.5% from the copper original.

EXAMPLE 4

Thermoplastic polyarylene polyether pellets prepared as in Example 2 were vacuum stripped for 3 hours at 300° F. The pellets were then compression molded at 490° F. in an electrically heated hydraulic press into a plaque measuring 8" x 8" x ⅛". The plaque was then contacted with a copper original relief printing plate coated with a silicone mold release oil and placed in an electrically heated hydraulic press having a four inch ram. The plaque and original were preheated at 490° F. for three minutes at zero pressure with the press platens closed. The thermoplastic matrix was then formed by applying 1250 p.s.i. for one minute. The temperature was reduced to 200° F. and the original and matrix removed and cooled to room temperature. The resultant matrix was flat and had perfect reproduction of detail including small dots in the 150 lines per inch screens. The matrix formed was measured and was found to have uniformly shrunk in all directions 0.63% from the copper original.

EXAMPLE 5

Four thermoplastic polyarylene polyether matrices, having dimension of 4 x 10 inches, were molded from an original copper engraving as described in Example 3. The matrices were degreased by washing in heptane and then dried.

To render their surfaces electrically conductive so that a nickel shell could be plated on them, all were first dipped in a sensitizing solution having the following formula:

| | |
|---|---|
| Stannous chloride ($SnCl_2 \cdot 2H_2O$) ---------gms-- | 100 |
| Conc. hydrochloric acid (37% HCl) --------cc-- | 400 |
| Water ----------------------------------cc-- | 1000 |

Immersion time was for one minute followed by a one minute rinse in running water. Then followed a one minute immersion in an activator solution with a formulation:

| | |
|---|---|
| Palladium chloride ($PdCl_2$) ------------gm-- | 0.15 |
| Conc. hydrochloric acid (37% HCl) ----gms-- | 7.50 |
| Water -------------------------------cc-- | 1000.00 |

A one minute rinse in running water followed.

The treated matrices were then coated with a one micron layer of copper, deposited from an electroless copper plating solution with a formulation:

(A)

| | oz./gal. |
|---|---|
| Rochelle salt ($NaKC_4H_4O_6 \cdot 4H_2O$)------------ | 22.68 |
| Copper sulfate ($CuSO_4 \cdot 5H_2O$)--------------- | 4.67 |
| Sodium hydroxide (NaOH)------------------ | 6.67 |
| Ethylene diamine tetraacetic acid (disodium salt)- | 1.33 |
| Sodium carbonate ($Na_2CO_3$)------------------ | 4.00 |

(B)

Formaldehyde (40% by volume in water).

Five parts of (A) were added to one part of (B).

The electroless plated matrices were immersed for 10 minutes in this solution, followed by rinsing in running water for two minutes.

Nickel shells of 0.5, 1.0, 2.0, and 4.0 mils thickness were electrolytically deposited on the electroless copper conductive layer of the four matrices from a Watt's type acid electrolytic nickel plating bath containing:

| | oz./gal. |
|---|---|
| Nickel sulfate ($NiSO_4 \cdot H_2O$)---------------------- | 34 |
| Nickel chloride ($NiCl_2$)------------------------- | 5 |
| Boric acid ($H_3BO_3$)-------------------------- | 3 |
| Sulfuric acid ($H_2SO_4$) to give pH 4. | |
| Water to make 13 gals. of solution. | |

To this solution were added 3 pounds of carbonyl nickel powder having a spherical shape and a particle size from 4 to 7 microns. This powder was maintained in suspension by passing compressed air through six nozzles placed at the bottom of the plating tank which kept the whole solution bubbling vigorously.

Two nickel anodes were hung from the positive bus bar in the tank. The copperized matrices were hung from the negative bus bar. Plating was begun by passing a direct current of 50 amperes per square foot of matrix surface through the bath for 12 minutes with a bath temperature of 75° F. to deposit the 0.5 mil nickel shell, 24 minutes to deposit the 1.0 mil shell, 48 minutes to deposit the 2.0 mil shell, and 96 minutes to deposit the 4.0 mil shell. At the end of their respective plating times the shells still supported by their matrices were removed from the plating bath, rinsed in running water for two minutes and dried by placing them in an oven for 10 minutes at 187° F.

Each shell had on its back a rough, sandpaper-like surface of interlocking nickel particles firmly anchored to the nickel of the shell. These plating times were much shorter than the three to four hours required to build up 10 to 15 mil conventional nickel-copper shells, using two or three different plating baths instead of the single one required in this invention.

EXAMPLE 6

A thermoplastic polyarylene polyether matrix was formed from an original copper engraving as in Example 3, sensitized and plated with a nickel shell 0.5 mil thick with the roughened back of nickel powder firmly attached to the back as described in Example 5.

This shell, still in contact with the matrix, was placed face down in a cavity mold measuring 7½" x 10½" x ¼". 9.6 oz. of granules of a polyhydroxyether resin with a melt flow of 3.0 dg./min. at 44 p.s.i. and 220° C. were spread over the back of the shell. The cavity mold containing the matrix, the shell and the resin was placed in a hydraulic press and heated to 300° F. with the press platens closed to contact pressure only to flux the resin for 5 minutes.

A pressure of 500 p.s.i. was then applied to the press for two minutes, followed by cooling to below 150° F.

After the backed up shell had been separated from the matrix, an electrotype printing plate with a plastic back resulted with very exact reproduction of the detail in the original engraving and no warping due to differential thermal contraction as is the case with conventional electrotypes, 12–15 mils thick when backed with plastics. Thus no flattening operation is required before mounting on a printing press. The matrix was then ready to be used over again.

The plate was shaved to a uniform thickness of 154 mils, leveled on the sides, and was ready for mounting on the printing press. No routing was required on this plate because the non-image areas were not pushed up under pressure since they were supported by the matrix during the molding of the back.

Adhesion was very strong. The 0.5 mil shell could not be peeled off in any way, being anchored by the many jagged nickel protrusions furnished by the free nickel particles that became plated into the back of this thin shell.

EXAMPLE 7

A thermoplastic polyarylene polyether matrix was molded from a magnesium original plate as described in Example 4. A nickel shell was plated on it as described in Example 5 to a thickness of 4.0 mils, having the roughened back of nickel powder firmly attached to it.

This shell still in contact with the matrix was placed face down in a 10" x 13" x ¼" cavity mold. 9.2 ounces of granules of a polyvinyl chloride printing plate molding composition sold by Williamson and Co., and designated as their R–9400 formulation. The cavity mold, containing the matrix, the shell and the resin was placed in a hydraulic press and heated to 300° F. for 5 minutes with the press platens closed to contact pressure only. 500 p.s.i. pressure was then applied for two minutes, followed by cooling to 100° F.

The backed up shell was separated from the matrix (which was then ready to be used over again) and finished in the manner described in Example 6. An excellent printing plate resulted.

Peel tests were run to test the adhesion of the shell to the plastic back by the following means. A strip of the shell one-quarter inch wide was cut in the shell and peeled back enough so that a clamp of known weight could be attached to it. The plate was supported horizontally at each end with the face down so that the weight pulled at an angle of 90°. The weight was increased progressively until a value was reached where the shell would just peel slowly under the force exerted by the weight. This weight, multiplied by 4 to equal lbs./linear in. of pull was recorded as the peel strength in pounds per inch.

It was found that adhesion measured by this peel test was dependent on the degree of roughness produced by the nickel powder. This roughness was judged by the difference in level between the basic shell and the level of the nap caused by the powder buildup. As the roughness increased, the peel strength increased roughly as the square of the nap height and soon reached a condition where failure was due to exceeding the tensile strength of the nickel shell or breaking the plastic. This unlimited adhesion results from the dendritic structure that builds up as the nap height becomes 3 to 4 mils as seen by the following table.

| | | | | | |
|---|---|---|---|---|---|
| Nap height, mils | 0.3 | 1.0 | 2.0 | 3.0 | 4.0 |
| Peel strength, lbs./in | 0.5 | 4.3 | 10.5 | 25.4 | (1) |

(1) Shell breaks.

EXAMPLE 8

A thermoplastic polyarylene and polyether matrix was molded from a magnesium original etching as described in Example 3. A nickel shell was plated on it as described in Example 5 to a thickness of 2.0 mils having the roughened back of nickel powder firmly attached to it.

This shell still in contact with the matrix was placed face down in a 10" x 13" x ¼" cavity mold. 7.5 ounces of granules of a ethylene/vinyl acetate copolymer having the following specifications were spread on the back of the shell:

| | | |
|---|---|---|
| Vinyl acetate | percent | 28 |
| Density | | 0.950 |
| Melting point | ° F. | 150 |
| Shore A durometer | | 85 |

The cavity mold, containing the shell and the resin, was placed in a hydraulic press and heated to 300° F. for 5 minutes with the platens closed to contact pressure only. 500 p.s.i. pressure was then applied for two minutes, followed by cooling to 130° F.

The backed up shell was separated from the matrix (which was then ready to be used over again) and finished in the manner described in Example 6. An excellent printing plate resulted. A peel test, as described in Example 6, indicated a peel strength of 4.3 lbs./in. due to the softness of the vinyl acetate compound.

This plate was finished by grinding the back with an abrasive belt to 0.120" and trimmed to size with a shear. It could be readily bent to fit a press cylinder and be attached to it by the conventional two-sided pressure tape after bending without sensitive adhesives known in the trade as "Stickyback."

EXAMPLE 9

A thermoplastic polyarylene polyether matrix was molded from a magnesium original etching as described in Example 3. A nickel shell was plated on it as described in Example 5 to a thickness of 1.0 mil with 5 minutes of vigorous agitation, followed by 5 minutes without agitation in the plating tank to produce the roughened back of nickel powder firmly attached to it.

This shell still in contact with the matrix was placed face down in a 10" x 13" x ¼" cavity mold. Three sheets 0.65 mil thick of a butadiene/acrylonitrile rubber having a Shore A durometer of 50 were placed over the back of the shell. The cavity mold containing the shell and the sheets of uncured rubber were placed in a hydraulic press and heated for 45 seconds with the platens at contact pressure only. 500 p.s.i. pressure was then applied for 7 minutes, followed by removal of the cavity mold from the press.

The rubber-backed shell was separated from the matrix (which was then ready to be used over again). The plate ground as in Example 9 to a thickness of 120 mils and trimmed with a vertical shear and was then ready for mounting on a printing press by the conventional "Stickyback."

This plate was highly flexible and could be easily conformed to the plate cylinder of a flexographic press and fastened by the conventional two-sided pressure sensitive adhesives. The plate had the advantage of having a hard metal face and a flexible resilient back, a type of printing plate much desired by the industry. Peel tests showed adhesion of 10.5 lbs./in. due to the softness of the rubber.

Example 10

A polyarylene polyether matrix 4½" x 10" was molded from a copper original etching as described in Example 3. The matrix was then sprayed through a two-part mixing spray gun to deposit a coating of metallic silver upon the matrix surface and render it electrically conductive. The solutions which were mixed in the spray gun in equal proportion (where the silver nitrate was reduced immediately to metallic silver) were as follows:

| | Oz./gal. |
|---|---|
| Solution A: | |
| Silver nitrate ($AgNO_3$) | 1.3 |
| Ammonia ($NH_3$) added as 28% $NH_4OH$ | 0.59 |
| Solution B: | |
| Hydrazine sulfate | 2.56 |
| Sodium hydroxide (NaOH) | 0.64 |

A nickel shell 3.0 mils thick was then plated in the manner described in Example 5 to produce the roughened nickel powder on the back tightly bonded to the shell.

This shell in contact with its matrix was backed up with a polyhydroxyether resin and finished as described in Example 6. An excellent printing plate resulted.

Example 11

Example 5 is duplicated using a matrix formed from thermoplastic polyarylene polyether having the formula

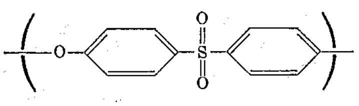

prepared from 4,4'-dihydroxydiphenyl sulfone and 4,4'-dichlorodiphenyl sulfone according to the procedure in Example 1.

Example 12

Example 6 is duplicated using a matrix formed from thermoplastic polyarylene polyether having the formula

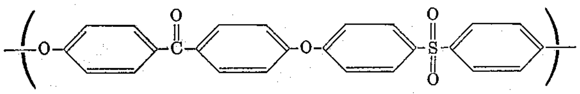

prepared from the bisphenol of benzophenone and 4,4'-dichlorodiphenylsulfone according to the procedure in Example 1.

Example 13

Example 7 is duplicated using a matrix formed from thermoplastic polyarylene polyether having the formula

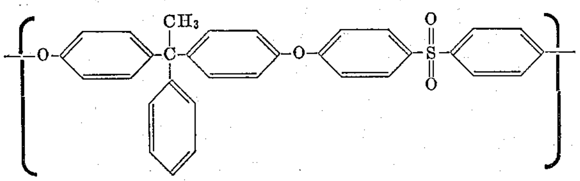

prepared from the bisphenol of acetophenone and 4,4'-dichlorodiphenylsulfone according to the procedure in Example 1.

Example 14

Example 8 is duplicated using a matrix formed from thermoplastic polyarylene polyether having the formula

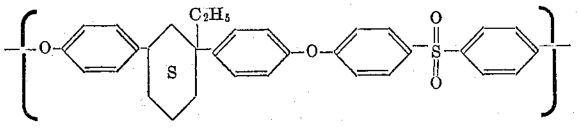

prepared from the bisphenol of vinyl cyclohexene (prepared by an acid catalyzed condensation of 2 moles of phenol with one mole of vinyl cyclohexene) and 4,4'-dichlorodiphenylsulfone according to the procedure in Example 1.

Example 15

Example 9 is duplicated using a matrix formed from thermoplastic polyarylene polyether having the formula

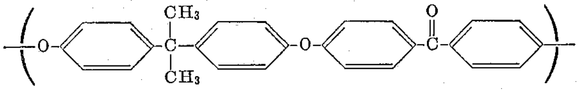

prepared from 2,2'-bis-(4-hydroxyphenyl)propane and 4,4'-difluorobenzophenone according to the procedure in Example 1.

Example 16

Example 10 is duplicated using a matrix formed from thermoplastic polyarylene polyether having the formula

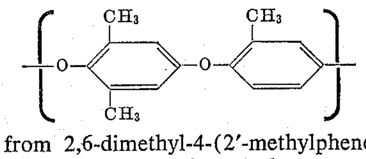

prepared from 2,6-dimethyl-4-(2'-methylphenoxy)phenol according to the procedure of Example 2.

Example 17

Example 9 is duplicated using a matrix formed from thermoplastic polyarylene polyether having the formula

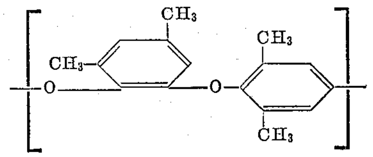

prepared from 2,4-dimethyl-6-(2',6'-dimethylphenoxy) phenol according to the procedure in Example 2.

Example 18

Example 8 is duplicated using a matrix formed from thermoplastic polyarylene polyether having the formula

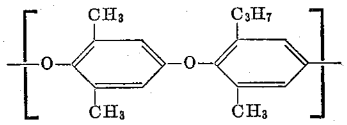

prepared from 2,6-dimethyl-4-(2'-n-propyl-6'-methylphenoxy)phenol according to the procedure in Example 2.

Example 19

Example 7 is duplicated using a matrix formed from thermoplastic polyarylene polyether having the formula

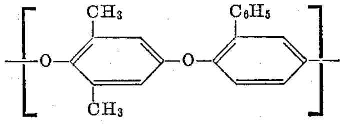

prepared from 2,6-dimethyl-4-(2'-phenylphenoxy)phenol according to the procedure in Example 2.

We claim:

1. Process for preparing an electrotype printing plate which comprises rendering the surface of a thermoplastic polyarylene polyether matrix electrically conductive, electroplating a platable metal onto the electrically conductive surface of said matrix from an agitated electroplating bath containing from about 0.1 to about 20 parts by weight of finely divided metal powder which is the same as said platable metal to form an electroplated metal shell having a roughened, semi-porous back and a thickness of from about 0.5 mil to about 4 mils, thereafter while maintaining the so produced shell in contact with said matrix backing said shell with a thermoplastic material employing heat and pressure.

2. Process of claim 1 wherein said matrix is formed from a sheet of a linear thermoplastic polyarylene polyether, composed of recurring units having the formula:

—O—E—O—E'— wherein —E— is the residuum of a dihydric phenol after removal of the two aromatic hydroxyl groups and —E'— is the residuum of a dihalobenzenoid compound after removal of the halogen atoms on the benzenoid nucleus, —E'— having an inert electron withdrawing group in at least one of the positions ortho and para to the halogen atoms, and —E— and —E'— being bonded through aromatic ether oxygen atoms.

3. Process of claim 2 wherein said polyarylene polyether is composed of recurring units having the formula

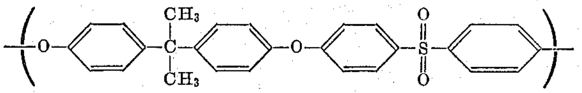

4. Process of claim 2 wherein said polyarylene polyether is composed of recurring units having the formula

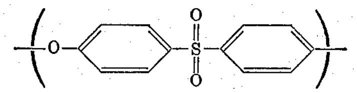

5. Process of claim 1 wherein said matrix is formed from a sheet of thermoplastic polyarylene polyether composed of recurring units having the formula

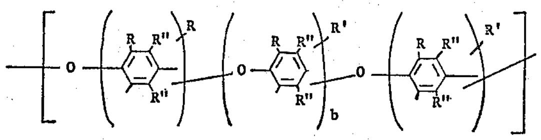

wherein the free valence of the terminal oxygen atom of one unit is connected to the free valence of the terminal benzene nucleus of the adjoining unit, *b* is an integer of from 0 to 1 inclusive, R is a monovalent substituent selected from the group of hydrocarbon radicals, halohydrocarbon radicals having at least 2 carbon atoms, alkoxy radicals, and haloalkoxy radicals having at least 2 carbon atoms, R' and R'' are the same as R and in addition hydrogen.

6. Process of claim 5 wherein said polyarylene polyether is composed of recurring units having the formula

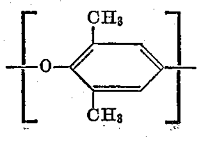

7. Process of claim 1 wherein said platable metal is selected from the group of nickel and copper.

8. Process of claim 1 wherein the surface of said matrix is rendered electrically conductive by applying a conductive silvering solution to said surface.

9. Process of claim 1 wherein the surface of said matrix is rendered electrically conductive by electroless deposition of a thin metal layer on said surface.

10. Process of claim 1 wherein the backing of said shell with a thermoplastic material is carried out at a pressure of from about 60 to 1500 p.s.i.g. and a temperature of from about 200° F. to about 350° F.

11. Process of claim 1 wherein said electrotype printing plate is electroplated with a thin layer of chromium after being separated from said matrix.

12. Process of claim 1 wherein said electrotype printing plate remains in contact with said matrix during the finishing operations of shaving, routing, leveling and curving and/or mounting are performed on said printing plate.

13. Process for preparing an electrotype printing plate which comprises rendering the surface of a thermoplastic polyarylene polyether matrix electrically conductive, electroplating a platable metal onto the electrically conductive surface of said matrix from an electroplating bath followed by immersion and further electroplating of said platable metal in an agitated electroplating bath containing from about 0.1 to about 20 parts by weight of finely divided metal powder which is the same as said platable metal to form an electroplated metal shell having a roughened, semi-porous back and a thickness of from about 0.5 mil to about 4 mils, and thereafter backing said shell with a thermoplastic material employing heat and pressure while maintaining said shell in contact with said matrix.

References Cited

UNITED STATES PATENTS

| | | | |
|---|---|---|---|
| 2,044,431 | 6/1936 | Harrison. | |
| 2,400,518 | 5/1946 | Kreber et al. | 101—401.1 |
| 2,753,800 | 7/1956 | Pawlyk et al. | 101—401.1 |
| 3,124,068 | 3/1964 | Thomas | 101—401.1 |
| 3,145,654 | 8/1964 | Johnson et al. | 101—401.1 |

ROBERT E. PULFREY, *Primary Examiner.*

J. A. BELL, *Assistant Examiner.*